(12) United States Patent
Karasovsky et al.

(10) Patent No.: US 11,170,103 B2
(45) Date of Patent: Nov. 9, 2021

(54) METHOD OF DETECTING MALICIOUS FILES RESISTING ANALYSIS IN AN ISOLATED ENVIRONMENT

(71) Applicant: AO Kaspersky Lab, Moscow (RU)

(72) Inventors: Dmitry V. Karasovsky, Moscow (RU); Alexey S. Shulmin, Moscow (RU); Denis Y. Kobychev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 429 days.

(21) Appl. No.: 16/276,725

(22) Filed: Feb. 15, 2019

(65) Prior Publication Data

US 2020/0004960 A1    Jan. 2, 2020

(30) Foreign Application Priority Data

Jun. 29, 2018 (RU) .......................... RU2018123696

(51) Int. Cl.
*G06F 21/00* (2013.01)
*G06F 21/56* (2013.01)
(Continued)

(52) U.S. Cl.
CPC .............. *G06F 21/56* (2013.01); *G06F 21/53* (2013.01); *G06F 21/552* (2013.01)

(58) Field of Classification Search
CPC ...... G06F 21/566; G06F 21/552; G06F 21/56; G06F 21/53
See application file for complete search history.

(56) References Cited

U.S. PATENT DOCUMENTS 7,917,647 B2 * 3/2011 Cooper .................. H04L 43/00
709/233
8,555,385 B1 * 10/2013 Bhatkar ................ G06F 21/556
726/22
(Continued)

FOREIGN PATENT DOCUMENTS

RU            2649794 C1     4/2018

OTHER PUBLICATIONS

Albano, Justin. "How to Read a Thread Dump" Internet article at: https://dzone.com/articles/how-to-read-a-thread-dump. published on Jun. 23, 2018. 13 pages. (Year: 2018).*

(Continued)

*Primary Examiner* — Don G Zhao
(74) *Attorney, Agent, or Firm* — Arent Fox LLP; Michael Fainberg (57) ABSTRACT

Disclosed are systems and methods for recognizing files as malicious. One exemplary method comprises intercepting a file for analysis received at a computing device of a user, opening the file for analysis in an environment for safe execution, generating a log that stores a portion of information occurring during opening of the file for analysis in the environment for safe execution, analyzing the log to recognize a first set of security related events from the portion of information, tracking a second set of security related events when the file for analysis is opened on the computing device, comparing the second set of security related events and the first set of security related events to identify a discrepancy; and in response to identifying the discrepancy, recognizing the file under analysis as malicious.

18 Claims, 4 Drawing Sheets

(51) Int. Cl.
*G06F 21/53* (2013.01)
*G06F 21/55* (2013.01)

(56) References Cited

U.S. PATENT DOCUMENTS

| | | | |
|---|---|---|---|
| 9,210,183 B2* | 12/2015 | Sadovsky | G06Q 20/4016 |
| 9,213,838 B2* | 12/2015 | Lu | G06F 21/568 |
| 9,613,210 B1 | 4/2017 | Wang et al. | |
| 9,836,605 B2 | 12/2017 | Yu | |
| 9,916,440 B1 | 3/2018 | Paithane et al. | |
| 10,027,689 B1* | 7/2018 | Rathor | H04L 67/10 |
| 10,476,899 B2* | 11/2019 | Cochin | G06F 21/566 |
| 2003/0101353 A1* | 5/2003 | Tarquini | H04L 63/1408 726/23 |
| 2011/0145926 A1* | 6/2011 | Dalcher | G06F 21/53 726/26 |
| 2011/0225655 A1 | 9/2011 | Niemelae et al. | |
| 2014/0237537 A1* | 8/2014 | Manmohan | G06F 21/53 726/1 |
| 2015/0172300 A1* | 6/2015 | Cochenour | G06F 21/6218 726/23 |
| 2015/0205962 A1* | 7/2015 | Swidowski | G06F 21/554 726/23 |
| 2015/0379268 A1 | 12/2015 | Singh et al. | |
| 2017/0004310 A1 | 1/2017 | Ivanov et al. | |
| 2017/0091457 A1 | 3/2017 | Zakorzhevsky et al. | |
| 2017/0093897 A1* | 3/2017 | Cochin | G06F 21/566 |
| 2017/0154048 A1* | 6/2017 | Palmert | G06F 16/24578 |
| 2017/0223046 A1* | 8/2017 | Singh | H04L 63/1491 |
| 2017/0289191 A1* | 10/2017 | Thioux | H04L 63/1441 |
| 2018/0139216 A1* | 5/2018 | Rasanen | H04L 63/145 |
| 2018/0225447 A1* | 8/2018 | Pintiysky | G06F 21/53 |
| 2018/0260574 A1* | 9/2018 | Morello | G06F 21/566 |
| 2018/0351969 A1* | 12/2018 | MacLeod | H04L 63/1416 |
| 2018/0359272 A1* | 12/2018 | Mizrachi | G06F 21/57 |
| 2019/0014086 A1* | 1/2019 | Meyer | G06F 21/566 |
| 2019/0028494 A1* | 1/2019 | Mizrachi | H04L 63/1425 |
| 2019/0109870 A1* | 4/2019 | Bedhapudi | H04L 63/0428 |
| 2019/0121977 A1* | 4/2019 | Gordeychik | G06F 21/566 |
| 2019/0222591 A1* | 7/2019 | Kislitsin | G06F 9/45558 |
| 2019/0332769 A1* | 10/2019 | Fralick | G06F 21/566 |
| 2019/0379683 A1* | 12/2019 | Overby | H04L 63/1408 |
| 2019/0392146 A1* | 12/2019 | Gezalov | G06F 21/552 |
| 2019/0392147 A1* | 12/2019 | Gezalov | G06F 21/566 |
| 2021/0117544 A1* | 4/2021 | Kurtz | G06F 21/567 |

OTHER PUBLICATIONS

Hassan Mourad: "SANS Institute Information Security Reading Room Sleeping Your Way out of the Sandbox", Feb. 10, 2015 (Feb. 10, 2015).

* cited by examiner

METHOD OF DETECTING MALICIOUS FILES RESISTING ANALYSIS IN AN ISOLATED ENVIRONMENT

CROSS-REFERENCE TO RELATED APPLICATIONS

This application claims benefit of priority under 35 U.S.C. 119(a)-(d) to Russian Patent Application No. 2018123696, filed on Jun. 29, 2018, which is incorporated by reference herein.

FIELD OF TECHNOLOGY

The present disclosure relates to identifying malicious files and more particularly to methods and systems of recognizing malicious files that resist analysis in an isolated environment.

BACKGROUND

At present there is a growing number of malicious software (such as computer viruses, Trojan horses, Internet worms) designed to cause harm to both user data and to the actual user of the electronic device infected with the malicious software. The harm may be caused by damaging or deleting user files, using the resources of the computing device of the user for "mining" of cryptocurrencies, stealing electronic and confidential user data (correspondence, images, logins, passwords, bank card data) and other actions. Moreover, malicious software is constantly changing, since the creators thereof resort to ever new mechanisms of attack and defense against security applications. Various mechanisms are used, such as obfuscation of the malicious code (in other words, changing the original text or executable program code into a form which preserves its functionality, yet impedes analysis, understanding of the working algorithm, and modification while decompiling) or the use of mechanisms for resisting emulation (for example, the malicious software is endowed with functions to recognize that it is being run in an emulator, and it does not display its malicious activity).

Furthermore, malicious software often does not manifest its malicious activity all at once, but instead performs a multitude (in the order of millions) of calls of API functions, enormous cycles (in the order of billions of iterations), stops working for a certain time immediately after being launched (for example, for one hour by using the "Sleep( )" function). User computing devices at present have high performance and multiple-core processors (there are also multiprocessor systems), so that the user might not notice or attach importance to the workload of one of the cores. Moreover, the user normally uses the device for longer than one hour after it has been turned on. Therefore, there is no need for malicious software, if it has launched, to manifest its activity at once.

In order to combat said techniques, the makers of security applications (such as antivirus applications) employ techniques with the use of virtual machines in the form of an isolated environment for safe execution of files. Oftentimes such virtual machines are called sandboxes. The hypervisors under the control of which such virtual machines run contain mechanisms for intercepting the functions that are called by applications which are being executed in them.

It should be noted that security applications employ various methods for defining malicious software, for example technologies such as signature and/or heuristic analysis. If in the course of the analysis no maliciousness has been determined for a file, it may be handed over by the security application to the aforementioned virtual machine for analysis of its behavior (for example, if it does not have a digital signature of a trusted software maker). The file handed over is then executed in the virtual machine, and in the course of its execution its actions and the events being carried out by its different function calls are intercepted, the intercepted events and actions are saved in a log, and afterwards analyzed by the security application or an expert in information security.

Thus, the known systems for intercepting and aggregation of events and actions work in two steps. In the first step, information is gathered; in the second step, it is analyzed.

However, if a file has not been recognized as being malicious according to the results of its execution in the virtual machine, this does not always mean that it is safe. For example, if the process launched from the file being analyzed (or from the application by which the analyzed file was opened) has halted its execution for one hour or attacks any mail client or messenger (a program for exchanging messages) by accessing the file with saved passwords, yet the program being attacked is absent from the virtual machine, then the maliciousness of the behavior of the file will not be revealed (since, not having found the required file with passwords, the malicious file will finish its execution by itself and not manifest malicious activity).

The present disclosure makes it possible to simplify the process of recognizing a file as malicious afterwards by using the already available results of the analysis of the file execution in a virtual machine.

SUMMARY

The present disclosure describes systems and methods that recognize malicious files in an isolated environment.

The technical result of the present disclosure is to broaden the arsenal of tools designed to recognize malicious files that resist analysis, in an isolated environment.

According to one aspect, a method for recognizing a file as malicious, comprises intercepting a file for analysis received at a computing device of a user, opening the file for analysis in an environment for safe execution, generating a log that stores a portion of information occurring during opening of the file for analysis in the environment for safe execution, analyzing the log to recognize a first set of security related events from the portion of information, tracking a second set of security related events when the file for analysis is opened on the computing device, comparing the second set of security related events and the first set of security related events to identify a discrepancy and in response to identifying the discrepancy, recognizing the file under analysis as malicious.

According to one aspect, the method further comprises forming a behavior template based on the first set of security related events, calculating a coefficient of danger of the file under analysis based on events from the behavior template, increasing the coefficient of danger for each event found in the second set of security related events that is not found in the first set of security related events and recognizing the file under analysis is malicious when the coefficient of danger exceeds a threshold value.

According to one aspect, the portion of information comprises security events and context of the environment for safe execution.

According to one aspect, the security events comprise one or more of calling of an API function by a thread of a process opening the file for analysis, return from an API function, a system call, a return from a system call and an operating system message.

According to one aspect, the environment for safe execution is a virtual machine.

According to one aspect, opening the file for analysis comprises determining whether the file is executable, and if so, executing the file, otherwise reading the file by an application.

According to one aspect, generating the log is further performed during execution of all threads and processes relating to opening of the file for analysis.

According to one aspect, identifying the discrepancy comprises determining that the second set of security related events contains an event not found in the first set of security related events.

According to one aspect, the method further comprises stopping execution of all threads of processes created when opening the file for analysis on the computing device.

According to one aspect, the method further comprises deleting or quarantining the file for analysis.

In one aspect, the present disclose provides a system recognizing a file as malicious, comprising a hardware processor configured to intercept a file for analysis received at a computing device of a user, open the file for analysis in an environment for safe execution, generate a log that stores a portion of information occurring during opening of the file for analysis in the environment for safe execution, analyze the log to recognize a first set of security related events from the portion of information, track a second set of security related events when the file for analysis is opened on the computing device, compare the second set of security related events and the first set of security related events to identify a discrepancy and in response to identifying the discrepancy, recognize the file under analysis as malicious.

In another aspect, the present disclosure provides a computer readable medium, storing instructions thereon, the instructions comprising intercepting a file for analysis received at a computing device of a user, opening the file for analysis in an environment for safe execution, generating a log that stores a portion of information occurring during opening of the file for analysis in the environment for safe execution, analyzing the log to recognize a first set of security related events from the portion of information, tracking a second set of security related events when the file for analysis is opened on the computing device, comparing the second set of security related events and the first set of security related events to identify a discrepancy and in response to identifying the discrepancy, recognizing the file under analysis as malicious.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product of recognizing malicious files that resist analysis in an isolated environment. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following definitions and concepts are used throughout to describe variant aspects of the present disclosure.

In one aspect, a virtual machine in the form of an environment for safe file execution is defined as a set (complex) of software and hardware providing the resources of a host operating system to a guest operating system, wherein the guest operating system has no link to the host operating system.

Modules in the present disclosure may refer to actual devices, systems, components, groups of components, realized with the use of hardware such as integrated microcircuits (application-specific integrated circuits, ASICs) or field-programmable gate arrays (FPGAs) or, for example, in the form of a combination of software and hardware such as a microprocessor system and a set of program instructions, and also based on neurosynaptic chips. The functionality of the indicated modules may be realized exclusively by hardware, and also in the form of a combination, where some of the functionality of the modules is realized by software and some by hardware. In certain variant aspects, some or all of the modules can be implemented on the processor of a general-purpose computer (such as the one depicted in FIG. 4). Furthermore, the components of each of the modules may be realized within a single computing device or distributed among several interconnected computing devices.

Figure 1:
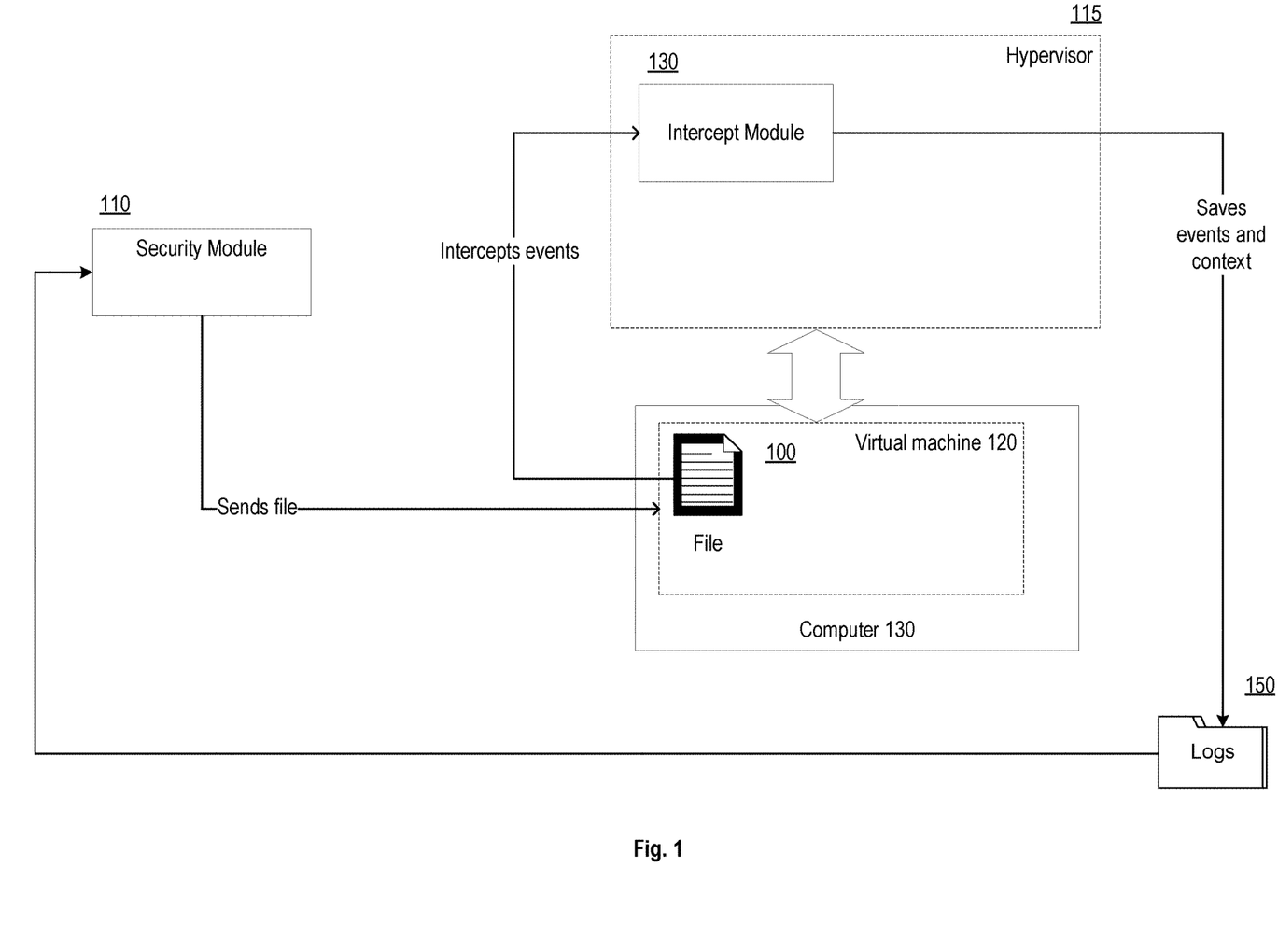
FIG. 1 shows an example of the analysis of a file for maliciousness in a virtual machine, in accordance with exemplary aspects of the present disclosure.

FIG. 1 shows an example of the analysis of a file for maliciousness in a virtual machine.

In the general case, the file 100 is opened in the virtual machine 120 in the form of an isolated environment for the execution of files. In one aspect, the virtual machine 120 is executing on a container or a computer 130. A security module 110 (or first security means) sends the file 100 to the virtual machine 120. In one variant aspect, the virtual machine 120 is created by the security module 110. In another variant aspect, the virtual machine 120 is selected by the security module 110 from previously created virtual machines.

It should be noted that the file 100 in the context of the present disclosure may be:

an executable file;
a dynamic library;
a script executed by any interpreter (such as Microsoft PowerShell files);
files containing scripts for execution (such as files of Microsoft Office or Adobe Acrobat formats);
a web page;
an image;
other files known from the prior art which can cause harm to the data of a user of a computing device when utilized (for example, when executed or opened by other applications), or the like.

In one variant aspect, the file 100 may be a link (such as a URL) and "opening" of the link in the present disclosure refers to following the link in a web browser installed in the virtual machine 120.

In the general case, the analysis of the file 100 is performed after the file is opened in the operating system of the virtual machine 120. In the present disclosure, opening of the file 100 refers to one of the following:
execution of the file 100, if the file 100 is executable;
opening of the file 100 by an application, if the file 100 is not executable.

The result of the opening of the file 100 is the creation and the launching for execution of a process in the virtual machine 120. At least one thread is created when the file 100 is opened.

In one variant aspect, the security module 110 and the hypervisor 115 of virtual machine 120 are implemented on the computing device of the user. In some aspects, the hypervisor 115 controls the operation of the virtual machine 120. In the given case, the security module 110 is a security application, such as an antivirus application. An example of the security module 110 is the security module 210 (or second security module), discussed further with respect to FIG. 2. In another case, the security module 110 and the hypervisor 115 are implemented on a remote server (or on different servers), or as a cloud service. The security module 110 in this case obtains the file 100 from third party sources (for example, from the security module 210 running on the computing devices of a user), and transfers the file 100 to the virtual machine 120, where the file 100 may be opened. In yet another case, the security module 110 obtains the file from other security modules carrying out the monitoring and intercepting of network traffic data.

In the general case, the hypervisor 115 contains an intercept module 130 (the intercept module 130 is a module, a component, or a functional part of the hypervisor 115). The intercept module 130 may intercept the events in the threads of the process created upon opening the file 100.

The events comprise, at least, one or more of:
the calling of an API function by the thread;
the return from an API function; and
a system call or, in other words, an accessing of the kernel of the operating system by the thread to execute any operation;
the return from a system call;
a message (notification) from the operating system (for example, the creation of a thread, the creation of a process, the loading of a module).

It should be noted that intercepting is possible on different rings of protection of the operating system of the virtual machine 120, which realize a hardware partitioning of the system and user levels of privileges, providing intercepting of events at:
the kernel level (kernel mode), and
the applications level (user mode).

In some aspects, during the execution of the threads of the process created upon opening the file 100, the intercept module 130 may determine the coding convention of the API functions being called by the threads. This makes it possible to unambiguously determine the use of the registers of the processor for the transmittal of parameters to the API functions being called. Thus, for example, the parameters of the calls will be found in the registers ECX (first parameter) or EDX (second parameter), and the rest of the parameters will be in the stack (register ESP). Furthermore, the coding convention makes it possible to unambiguously determine the values being returned. For example, if an API function returns the value "0", then it does so in the register EAX.

The intercepted event and the context of the processor are saved (saved data) by the intercept module 130 in the log 150 and sent to the security module 110 after executing the process that was created upon opening the file 100. The security module 110 in turn may give a verdict as to the maliciousness of the file 100 based on the data from the intercept module 130. In the general case, the verdict is given after analysis of the saved data, for example, depending on the sequence in which and the parameters with which the call for API functions was made by the threads of the process created upon opening the file 100. In one variant aspect, if no verdict has been given, at least some of the data saved by the intercept module 130 in the log 150 is handed over by the security module 110 to another security module, such as the security module 210. Furthermore, the data may be handed over either in the original form or in a modified form, for example, the data may be transformed into another form of representation of the data (data format), different from the form of representation of the data in the log 150.

Figure 2:
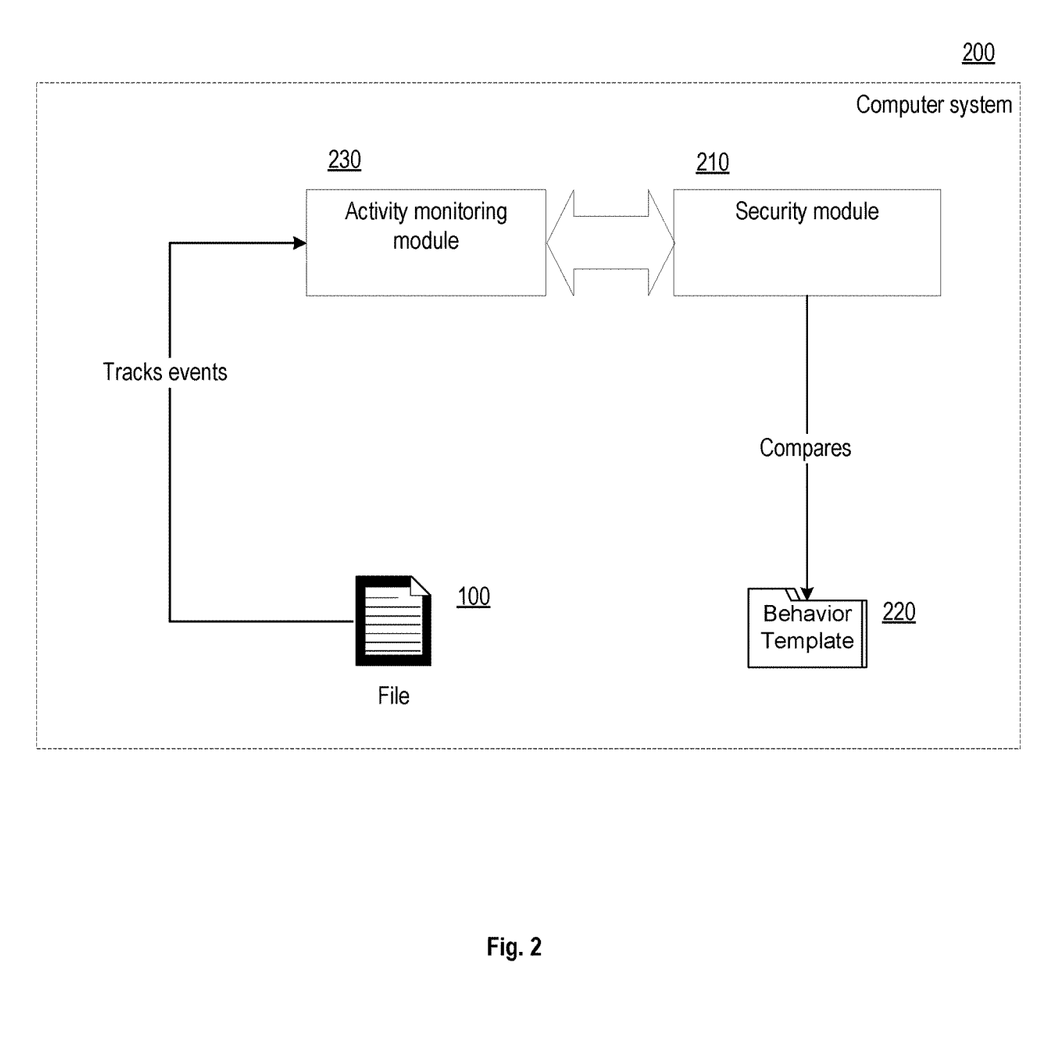
FIG. 2 shows a block diagram of the activity monitoring module, in accordance with exemplary aspects of the present disclosure.

In one variant aspect of the present disclosure, if no verdict has been given from the results of the analysis of the data saved in the log 150, the security module 110 forms from the log 150 a behavior template 220. The behavior template 220 is associated with the file 100 by a unique identifier, such as the check sum of the file 100, calculated for example with the aid of such algorithms as MD5, SHA-1, SHA-2 or SHA-3. The behavior template 220 may be used by the security module 210 (or the security module 110) or its components and subsystems for further investigation of the file 100 when it is opened on the computer system 200 and, in a particular instance, to recognize the file 100 as malicious. In one variant aspect, the security module 210 requests the behavior template 220 from the security module 110 or from a cloud storage where the behavior template 220 obtained from the security module 110 is kept, the request at least containing the unique identifier of the file 100.

The log 150 is formed from the events (and the processor contexts corresponding to the events) having occurred during the execution of the thread of the process created upon opening the file 100 in the virtual machine 120 in the form of an environment for safe execution of files. In some cases, the log 150 may contain a large number of records. The large volume of data filling up the log 150 makes it difficult, though not impossible, for the security module 210 to send, store, and use it for further investigation of the file 100 when it is opened on the computer system 200. Therefore, in one variant aspect of the present disclosure, a behavior template 220 is formed from the log 150 with the aid of the security module 110, which in one variant aspect is a compact variant of the representation of the log 150. The behavior template 220 includes information used for purposes of further investigation of the file 100 when the file 100 is being opened on the computer system 200. The purpose of such an investigation is to confirm that the events (or the events and the aforementioned processor context) occurring during the execution of the thread of the process created upon opening the file 100 on the computer system 200 are not different (or the differences are only due to a difference in the execution environment) from the events having occurred during the execution of the thread of the process created upon opening the file 100 in the virtual machine 120.

The events occurring during the execution of the thread of the process created upon opening the file 100 in the virtual machine 120 or on the actual computer system 200 can be divided into two categories: 1) events of value, or interest, to the analysis of the file for its maliciousness and 2) events not having value to the analysis. The events of value, or interest, to the maliciousness analysis are called security-related events.

In the general case, the security-related events are determined in part by the security module 110 (210) from the API functions and/or the processor context. For example, by classifying the API functions in terms of types (for example, "working with register", "working with memory", "interacting with other processes", and so forth) and by then assigning the defined types of API functions with to security-related events. In the case of the processor context, an example might be the changing of a specific system file the link to which is a parameter of the API function being called. For example, the intercept module 130 discovers the occurrence of an event, during the execution of the thread of the process created upon opening the file 100, connected with the changing of a page of the virtual memory (hereinafter, a memory page). Generally, the event connected with the changing of a memory page represents an API function call by the thread. Changing the data on the memory page may occur directly, for example by the call WriteProcessMemory( ), or covertly, for example by means of writing data with the use of SetWindowLong( ). In this case a window handle, for example, might be found in the processor context. A process writing into the memory of another process is a legitimate (not harmful) operation from the standpoint of the operating system. Yet malicious programs often use such mechanisms to insert malicious code into the address space of other processes. Such events will be classified by the security module 110 (and 210) as security-related events.

The security module 110 forms the behavior template 220 from the log 150 by including all the security-related events saved in the log 150 in the behavior template 220. In another variant aspect, the behavior template 220 is formed by the security module 110 by including at least some of the security-related events saved in the log 150 in the behavior template 220.

FIG. 2 shows an exemplary aspect of the proposed method of recognizing a file as malicious. In the context of the present disclosure, for each file 100 being analyzed with the use of the virtual machine 120 and for which no verdict has been given with regard to its maliciousness, the security module 110 forms a unique behavior template 220 from the log 150, which includes, as mentioned above, all or at least some of the security-related events saved by the intercept module 130 in the log 150. This behavior template is then used by the security module 210 which provides protection to the computer system 200.

After the file 100 has been opened and analyzed in the virtual machine 120 and not recognized as malicious, the file 100 goes to the computing device of the user, the computer system 200. For example, the file 100 may be extracted by any network security means providing monitoring of network traffic, such as one realized within a proxy server in the network where the computer system 200 is located. The file 100 may then be sent to the security module 110 for scanning, and subsequently transferred to the computer system 200. Upon opening the file 100 on the computer system 200, the security module 210 requests and obtains from the security module 110 the behavior template 220. In another variant aspect, the security module 110 requests and receives the behavior template 220 from a cloud service by which the behavior template 220 was obtained from the security module 110. In yet another variant aspect, the security module 210 already has the behavior template 220, since the security module 110 is the same as the security module 210. Opening of the file 100 on the computer system 200 refers to one of the following:

execution of the file 100, if the file 100 is executable; or
opening of the file 100 by an application, if the file 100 is not executable.

With the aid of the activity monitoring module 230, the security module 210 tracks the events occurring during the execution of the thread of the process created during the opening of the file 100 on the computer system 200. Similar to the intercept module 130, the activity monitoring module 230 intercepts events in the threads of the process created during the opening of the file 100 on the computer system 200. Furthermore, the events comprise one or more of:

the calling of an API function by the thread;
the return from an API function;
a system call or, in other words, an accessing of the kernel of the operating system by the thread to execute any operation;
the return from a system call; and
a message (notification) from the operating system (for example, the creation of a thread, the creation of a process, the loading of a module).

The intercepted event and the processor context are saved by the activity monitoring module 230 in a database (similar to the log 150). The database is analyzed in real time with the aid of the security module 210. In the context of the present disclosure, the security module 210 analyzes the events being tracked by the activity monitoring module 230. The security module 210 compares the security-related events with the events from the behavior template 220 and, if a security-related event is absent from the behavior template 220, the security module 210 draws the conclusion that the given file 100 made use of means of resisting analysis in the isolated environment (virtual machine 120), and it recognizes the file 100 as malicious.

The activity monitoring module 230 may be a protection component of the computer system 200 that allows the security module 210 to recognize the file 100 as malicious independently, without using the behavior template 220. The security module 210 recognizes the file as malicious without the behavior template 220 by comparing the sequences of events and the contexts intercepted by the activity monitoring module 230 with special rules for identifying malicious activity. The same sort of rules is used by the security module 110 to analyze the log 150. However, in the independent analysis by the security module 210 of the same sequence of events (plus contexts) as from the behavior template 220 plus one security-related event, it may not be sufficient to recognize a file 100 as malicious, since it is not known that the last event was not registered when opening the file 100 in the virtual machine 120 (proof that the file 100 made use of means of resisting analysis in an isolated environment). Thus, in the context of the present disclosure the technical result is achieved of an earlier discovery of a malicious file by finding a discrepancy in the security-related events occurring during the execution of the thread of the process created upon opening the file in the virtual machine and on the computer system.

In one variant aspect of the present disclosure, each security-related event is assigned (or matched up with) an individual evaluation. For example, the event is compared by the security module 110 to a set of criteria and receives an individual evaluation. This evaluation has a numerical value. The larger the value of the evaluation, the more dangerous the event. Using these evaluations, the security module 110 calculates a coefficient of danger of the file 100. If the coefficient of danger of the file 100 is above a previously established threshold, the security module 110 recognizes the file 100 as malicious. Thus, when the file 100 is opened on the computer system 200, the coefficient of danger of the file 100 as calculated by the security module 110 during the investigation of the file 100 in the virtual machine 120 will be sent to the security module 210 together with the behavior template 220. The security module 210 will as previously compare the security-related events with the events from the behavior template 220. However, each time that a security-related event is absent from the behavior template 220, the security module 210 will assign an evaluation to this event and recalculate the coefficient of danger of the file 100 (or increase the coefficient of danger of the file 100). The security module 210 will recognize the file 100 as malicious when the coefficient of danger of the file 100 exceeds an established threshold.

Figure 3:
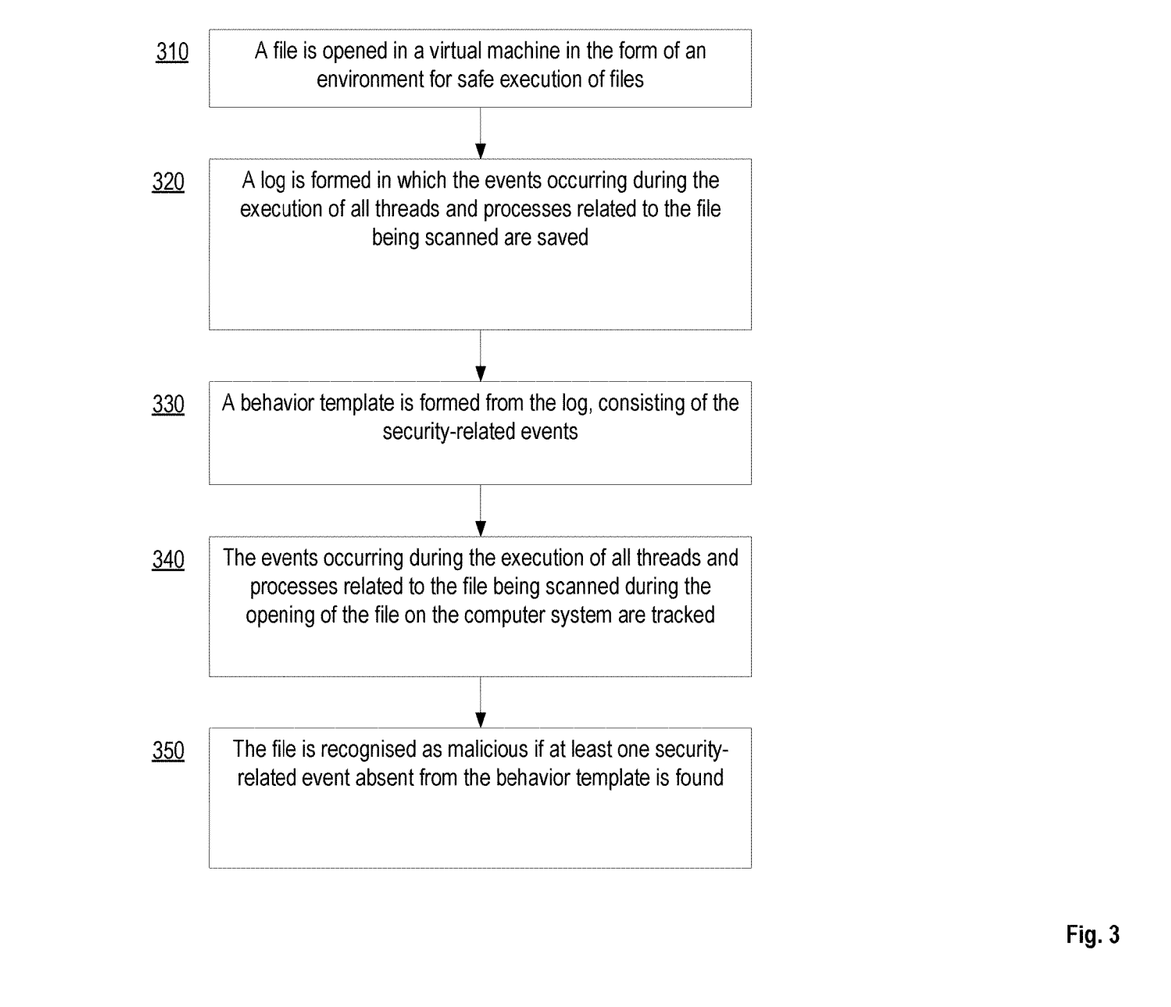
FIG. 3 is a flow diagram for method of recognizing a file as malicious, in accordance with exemplary aspects of the present disclosure.

FIG. 3 presents a flow diagram of the method of recognizing a file as malicious according to exemplary aspects of the present disclosure. According to the method realized in the context of the present disclosure, before a file 100 is opened on the computing device of the user (the computer system 200), for example in the course of being loaded onto the computer system 200, the file 100 is intercepted from the network traffic and sent to the security module 110. The security module 110 in step 310 opens the file 100 in an environment for safe execution of files, e.g., a virtual machine 120. The opening of the file 100 here is the execution of the file, if the file 100 is executable, or the opening of the file 100 is the reading of the file by an application, if the file 100 is not executable. Next, in step 320, the intercept module 130 of the hypervisor 115 forms, or generates, a log 150 in which the intercept module 130 saves the events occurring during the execution of at least one thread of the process created upon opening the file 100 in the virtual machine 120. In another variant aspect, the intercept module 130 of the hypervisor 115 forms the log 150 in which it saves events occurring during the execution of all the threads and processes relating to the file 100 in the virtual machine 120. Analyzing the log 150, the security module 110 does not give a verdict as to the maliciousness of the file 100, after which in step 330 the security module 110 forms from the log 150 a behavior template 220 including only those events from the log 150 that are related to security. If the file 100 was not recognized as malicious with the aid of the security module 110, the file 100 can be opened on the computer system 200. For example, the opening of the file 100 on the computer system 200 may be initiated by the user after its downloading from the network. Then, in step 340, the security module 210 with the aid of the activity monitoring module 230 tracks the events occurring during the execution of at least one thread of the process created during the opening of the file 100 on the computer system 200. In another variant aspect, the security module 210 with the aid of the activity monitoring module 230 tracks the events occurring during the execution of all threads and processes related to the file 100 on the computer system 200. The security module 210 recognizes the file 100 as malicious in step 350 in the event of discovering at least one security-related event absents from the behavior template 220. In another variant aspect, the security module 210 sends information about said events tracked with the aid of the activity monitoring module 230 to the security module 110, and the security module 110 recognizes the file 100 as malicious in the event of discovering at least one security-related event absents from the behavior template 220. The security module 210 stops the execution of all threads of the process created upon opening the file 100 on the computer system 200 and deletes the file 100 or places it in quarantine.

Figure 4:
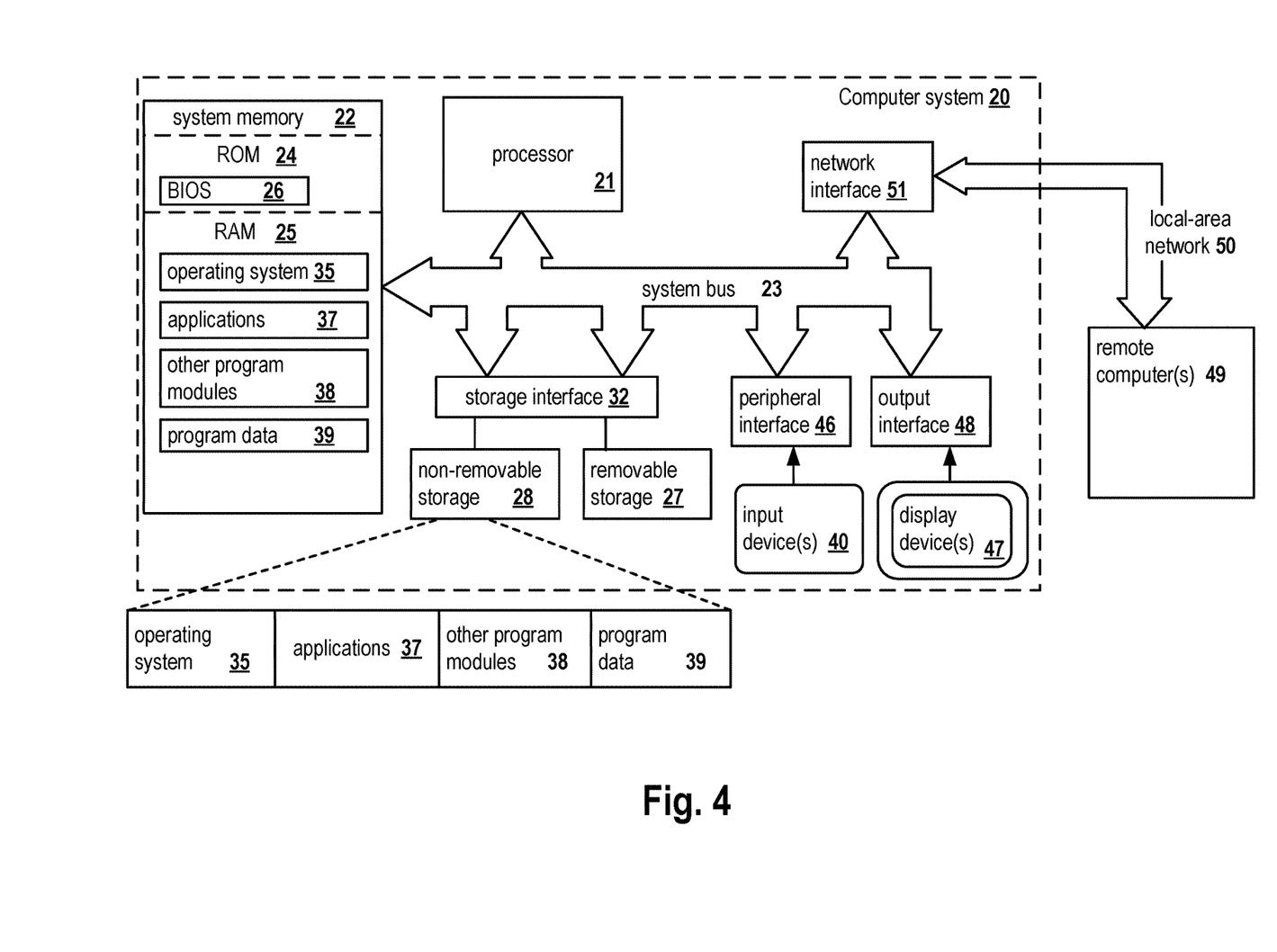
FIG. 4 shows an example of a general-purpose computer system, in accordance with exemplary aspects of the present disclosure.

FIG. 4 is a block diagram illustrating a computer system 20 on which aspects of systems and methods described above may be implemented in accordance with an exemplary aspect. It should be noted that the computer system 20 can correspond to the computer 130, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 1, above). Accordingly, each module may be realized in a variety of suitable configurations, and should not be limited to any particular implementation exemplified herein.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for recognizing a file as malicious, comprising:
   intercepting a file for analysis received at a computing device of a user;
   opening the file for analysis in an environment for safe execution;
   generating a log that stores a portion of information occurring during the opening the file for analysis in the environment for safe execution;
   analyzing the log to recognize a first set of security related events from the portion of information;
   forming a behavior template based on the first set of security related events, wherein the behavior template comprises a compact version of the log;
   calculating a coefficient of danger of the file for analysis based on events from the behavior template;
   tracking a second set of security related events when the file for analysis is opened on the computing device;
   comparing the second set of security related events and the first set of security related events to identify a discrepancy;
   increasing the coefficient of danger for each event found in the second set of security related events that is not found in the first set of security related events; and
   recognizing the file for analysis as malicious when the coefficient of danger exceeds a threshold value.

2. The method of claim 1, wherein the portion of information comprises the first set of security related events and context of the environment for safe execution.

3. The method of claim 2, wherein the security events comprise one or more of:
   calling of an API function by a thread of a process that is used for the opening the file for analysis;
   return from an API function;
   a system call;
   a return from a system call; and
   an operating system message.

4. The method of claim 2, wherein the environment for safe execution is a virtual machine.

5. The method of claim 1 wherein the opening the file for analysis comprises:
   determining whether the file is executable, and if so, executing the file;
   otherwise reading the file by an application.

6. The method of claim 1, wherein generating the log is further performed during execution of all threads and processes relating to the opening the file for analysis.

7. The method of claim 1, wherein identifying the discrepancy comprises determining that the second set of security related events contains an event not found in the first set of security related events.

8. The method of claim 1, further comprising:
   stopping execution of all threads of processes created during the opening the file for analysis on the computing device.

9. The method of claim 8, further comprising:
   deleting or quarantining the file for analysis.

10. A system for recognizing a file as malicious, comprising:
    a hardware processor configured to:
    intercept a file for analysis received at a computing device of a user;
    open the file for analysis in an environment for safe execution;
    generate a log that stores a portion of information occurring during the opening the file for analysis in the environment for safe execution;
    analyze the log to recognize a first set of security related events from the portion of information;
    form a behavior template based on the first set of security related events, wherein the behavior template comprises a compact version of the log;
    calculate a coefficient of danger of the file for analysis based on events from the behavior template;
    track a second set of security related events when the file for analysis is opened on the computing device;
    compare the second set of security related events and the first set of security related events to identify a discrepancy;
    increase the coefficient of danger for each event found in the second set of security related events that is not found in the first set of security related events; and
    recognize the file for analysis as malicious when the coefficient of danger exceeds a threshold value.

11. The system of claim 10, wherein the portion of information comprises the first set of security related events and context of the environment for safe execution.

12. The system of claim 11, wherein the security events comprise one or more of:
    calling of an API function by a thread of a process that is used for the opening the file for analysis;
    return from an API function;
    a system call;

a return from a system call;

and an operating system message.

13. The system of claim 11, wherein the environment for safe execution is a virtual machine.

14. The system of claim 10, wherein the opening the file for analysis comprises:

determining whether the file is executable, and if so, executing the file;

otherwise reading the file by an application.

15. The system of claim 10, wherein generating the log is further performed during execution of all threads and processes relating to the opening the file for analysis.

16. The system of claim 10, wherein identifying the discrepancy comprises determining that the second set of security related events contains an event not found in the first set of security related events.

17. The system of claim 10, wherein the hardware processor is further configured to:

stop execution of all threads of processes created during the opening the file for analysis on the computing device.

18. The system of claim 17, wherein the hardware processor is further configured to:

delete or quarantine the file for analysis.

\* \* \* \* \*